(12) United States Patent  
Halcom et al.

(10) Patent No.: US 9,315,265 B2  
(45) Date of Patent: Apr. 19, 2016

(54) ADJUSTABLE SCISSOR CONTROL LINK

(71) Applicant: Sikorsky Aircraft Corporation, Stratford, CT (US)

(72) Inventors: Lance Halcom, Coppell, TX (US); Bryan Kenneth Baskin, Arlington, TX (US); Frank P. D'Anna, Seymour, CT (US); David A. Darrow, Stratford, CT (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 362 days.

(21) Appl. No.: 13/953,260

(22) Filed: Jul. 29, 2013

(65) Prior Publication Data

US 2015/0298803 A1  Oct. 22, 2015

(51) Int. Cl.
  *B64C 27/52*  (2006.01)
  *B64C 27/59*  (2006.01)
  *B64C 27/605*  (2006.01)
  *B64C 27/06*  (2006.01)

(52) U.S. Cl.
  CPC ............. *B64C 27/59* (2013.01); *B64C 27/06* (2013.01); *B64C 27/605* (2013.01)

(58) Field of Classification Search
  None
  See application file for complete search history.

(56) References Cited

U.S. PATENT DOCUMENTS

| | | | | | |
|---|---|---|---|---|---|
| 2,829,721 | A | * | 4/1958 | Gebhard | B64C 11/48 416/115 |
| 3,109,496 | A | * | 11/1963 | Ellis, III | B64C 27/54 416/24 |
| 4,047,838 | A | * | 9/1977 | Ferris | B64C 27/605 416/115 |
| 4,573,873 | A | * | 3/1986 | Yao | B64C 27/59 416/114 |
| 5,165,854 | A | * | 11/1992 | Cicare | B64C 27/605 244/17.25 |
| 5,203,522 | A | * | 4/1993 | White | B64C 27/58 138/110 |

(Continued)

FOREIGN PATENT DOCUMENTS

GB  1519380  7/1978

OTHER PUBLICATIONS

Interantional Search Report issued in PCT/US2014/046084 on Nov. 4, 2014, 9 pages.

(Continued)

*Primary Examiner* — Medhat Badawi
(74) *Attorney, Agent, or Firm* — Cantor Colburn LLP

(57) ABSTRACT

A control link disposed to transfer rotor shaft rotation from an elongate element rotatable with a shaft to a rotatable element is provided and includes a structure terminating at a first end thereof as a mating element, which is securable to the elongate element such that the elongate element is rotatable about an axis defined through the mating element and such that a moment reaction in opposition to structure rotation about the elongate element is generated and a rod coupled to the rotatable element being and configured to be coupled to a second end of the structure at variable distances relative to the rotatable element.

16 Claims, 5 Drawing Sheets

(56) References Cited

U.S. PATENT DOCUMENTS

| | | | |
|---|---|---|---|
| 5,511,947 A * | 4/1996 | Schmuck | B64C 27/32 416/131 |
| 5,624,232 A * | 4/1997 | Certain | B64C 27/605 416/114 |
| 5,785,497 A * | 7/1998 | White | B64C 27/32 403/67 |
| 5,810,562 A * | 9/1998 | Byrnes | B64C 27/605 416/114 |
| 5,826,822 A * | 10/1998 | Rehm | B64C 27/605 244/17.25 |
| 5,913,659 A * | 6/1999 | Doolin | B64C 27/008 267/141.4 |
| 6,033,182 A * | 3/2000 | Rampal | B64C 27/605 244/17.25 |
| 6,149,386 A | 11/2000 | Rampal | |
| 6,152,696 A * | 11/2000 | Rampal | B64C 27/605 416/114 |
| 6,824,096 B2 * | 11/2004 | Zoppitelli | B64C 27/28 244/17.25 |
| 7,118,340 B2 * | 10/2006 | D'Anna | B64C 27/10 244/17.23 |
| 7,559,743 B2 | 7/2009 | Jalaguier | |
| 7,585,153 B1 | 9/2009 | Schmaling et al. | |
| 7,648,338 B1 | 1/2010 | Welsh | |
| 7,695,249 B2 * | 4/2010 | Krauss | B64C 27/10 416/134 A |
| 7,841,829 B2 * | 11/2010 | Schmaling | B64C 27/10 416/1 |
| 7,988,089 B2 * | 8/2011 | Wittmer | B64C 27/68 244/17.13 |
| 8,142,158 B2 * | 3/2012 | Schmaling | B64C 27/605 416/149 |
| 8,177,508 B2 | 5/2012 | Berthie | |
| 8,303,248 B2 | 11/2012 | Cabrera et al. | |
| 8,342,455 B2 * | 1/2013 | Allieta | B64C 27/56 244/17.13 |
| 8,858,179 B2 * | 10/2014 | Cowles | B64C 27/10 416/147 |
| 2006/0285976 A1 * | 12/2006 | Jalaguier | B64C 27/39 416/134 A |
| 2008/0111399 A1 * | 5/2008 | Zierten | B64C 27/605 296/210 |
| 2008/0253891 A1 * | 10/2008 | Cabrera | B64C 27/605 416/114 |
| 2009/0084891 A1 * | 4/2009 | Darrow, Jr. | B64C 7/00 244/17.19 |
| 2009/0097973 A1 * | 4/2009 | Cabrera | B64C 27/50 416/1 |
| 2009/0175725 A1 * | 7/2009 | Podgurski | B64C 27/35 416/134 A |
| 2009/0214340 A1 * | 8/2009 | Berthie | B64C 27/605 416/24 |
| 2009/0220341 A1 * | 9/2009 | Schmaling | B64C 27/10 416/114 |
| 2011/0150646 A1 * | 6/2011 | D'Anna | B64C 27/10 416/1 |
| 2012/0043412 A1 | 2/2012 | Brunken | |
| 2014/0091172 A1 * | 4/2014 | Arlton | B64C 27/14 244/17.23 |
| 2014/0271203 A1 * | 9/2014 | Foskey | F01D 7/00 416/147 |
| 2014/0271204 A1 * | 9/2014 | Shundo | B64C 29/0033 416/148 |

OTHER PUBLICATIONS

Written Opinion issued in PCT/US2014/046084 on Nov. 4, 2014, 5 pages.

* cited by examiner

ADJUSTABLE SCISSOR CONTROL LINK

BACKGROUND OF THE INVENTION

The subject matter disclosed herein relates to a rotor control system for a helicopter and, more particularly, to a rotor control system for a helicopter that includes an adjustable scissor control link.

Control of a rotary-wing aircraft, such as a vertical takeoff and landing (VTOL) aircraft or helicopter, is affected through cyclic and collective pitch control. Blade pitch control of a rotary-wing aircraft main rotor system is typically achieved through a swashplate assembly which transfers the motion of non-rotating control members within a stationary field to the rotating members within a rotational field.

The swashplate assembly generally includes two rings connected by a series of bearings with one swashplate ring connected to the airframe/gearbox (stationary field), and the other swashplate ring connected to a rotor hub (rotational field). Apart from rotary motion, the rotationally stationary swashplate ring and the rotational swashplate ring otherwise move as a unitary component.

BRIEF DESCRIPTION OF THE INVENTION

According to one aspect of the invention, a control link disposed to transfer rotor shaft rotation from an elongate element rotatable with a shaft to a rotatable element is provided and includes a structure terminating at a first end thereof as a mating element, which is securable to the elongate element such that the elongate element is rotatable about an axis defined through the mating element and such that a moment reaction in opposition to structure rotation about the elongate element is generated and a rod coupled to the rotatable element and configured to be coupled to a second end of the structure at variable distances relative to the rotatable element.

According to another aspect of the invention, a rotor control system for use with a rotor and an airframe is provided and includes a rotor shaft disposed to support rotation of the rotor, a stationary swashplate connected to the airframe, a rotating swashplate disposed to rotate relative to the stationary swashplate, a mixer housing and primary pitch control links disposed in the rotor shaft, the primary pitch control links being coupled to pivotable elongate elements, which are pivotable about the mixer housing, and secondary pitch control links respectively coupled at ends thereof to the elongate elements and the rotating swashplate to control a position of the primary pitch control links via the elongate elements. At least one of the secondary pitch control links includes an adjustable scissor control link.

According to yet another aspect of the invention, a helicopter is provided and includes an airframe, a rotor, which is rotatable to provide lift force for the airframe, and a rotor control system configured to control the rotor. The rotor control system includes a rotor shaft disposed to support rotation of a rotor, a stationary swashplate connected to an airframe, a rotating swashplate disposed to rotate relative to the stationary swashplate, a mixer housing and primary pitch control links disposed in the rotor shaft, the primary pitch control links being coupled to pivotable elongate elements, which are pivotable about the mixer housing, and secondary pitch control links respectively coupled at ends thereof to the elongate elements and the rotating swashplate to control a position of the primary pitch control links via the elongate elements. At least one of the secondary pitch control links is configured to transmit rotation of the rotor shaft to the rotating swashplate.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Just about every helicopter main rotor requires both pitching capability for collective and cyclic input as well as tracking capability for creating a smooth rotor blade path for each and every blade on the rotor to follow. With dual, coaxial rotors, however, it is often difficult to arrive at a low-drag, low-weight, yet highly serviceable solution that satisfies both of these requirements for the upper rotor. This is because the primary pitch control links (PCL's) that directly interface the upper rotor blade pitch horns are often times embedded inside of the rotor head and shaft, which makes tracking adjustment through this member very difficult. In such a helicopter design, a scissor control link (SCL) concept was introduced, combining the functionality of inputting pitch into the blade via a bellcrank (or walking beam) linkage while providing a scissoring function by driving the rotating side of the swashplate all within the same component. As such, while described in the context of a coaxial aircraft, it is understood that aspects can be used in non-coaxial aircraft.

In accordance with aspects of the invention, scissor control links are installed into a rotor control system for a helicopter having a dual, coaxial rotor configuration but usage of the invention is of course not limited to only that type of helicopter configuration. The scissor control links for these cases are axially adjustable and thereby provide a solution to the need for both pitching and tracking of the rotor. As described below, scissor control links interface with a rotor bellcrank or walking beam as well as the rotating swashplate. Through this linkage, the rotor blade is pitched and tracked through a pitch control link that attaches at one end to the pitch horn of the rotor blade and at the other end to the bellcrank/walking beam. In this way, the scissor control link can both indirectly pitch/track the rotor as well as drive the rotating side of the swashplate.

Figure 1:
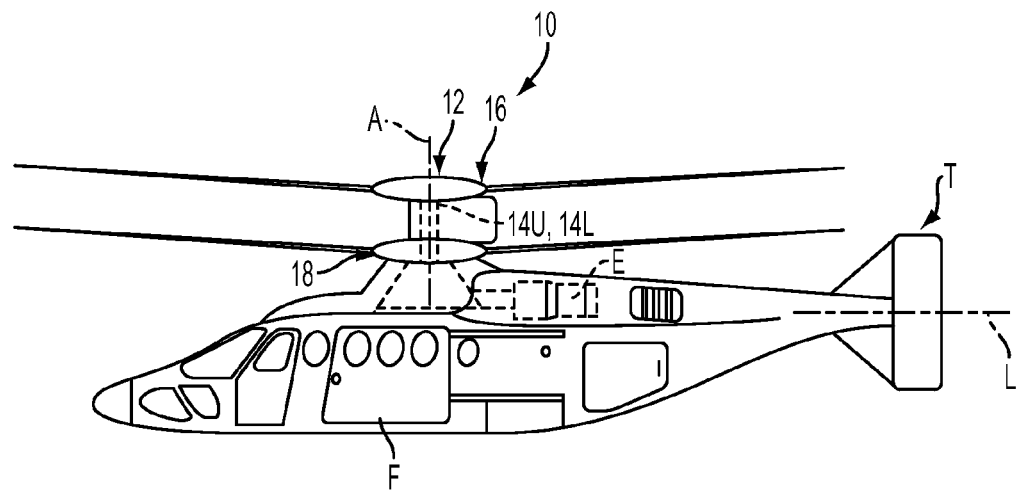
FIG. 1 is a perspective side view of an exemplary rotary-wing aircraft in accordance with embodiments.

FIG. 1 illustrates an exemplary vertical takeoff and landing (VTOL) rotary-wing aircraft 10 having a dual, counter-rotating, coaxial rotor system 12 which rotates through a counter-rotating main rotor shaft 14U, 14L (FIG. 2) about an axis of rotation A. The aircraft 10 includes a fixed airframe F, which supports the dual, counter rotating, coaxial rotor system 12 as well as an optional translational thrust system T, which provides translational thrust during high speed forward flight in a direction that is generally parallel to an aircraft longitudinal axis L. Although a particular counter-rotating, coaxial rotor system aircraft configuration is illustrated in the disclosed embodiment, other rotor systems and other aircraft types such as tilt-wing and tilt-rotor aircraft will also benefit from the present invention.

Figure 2:
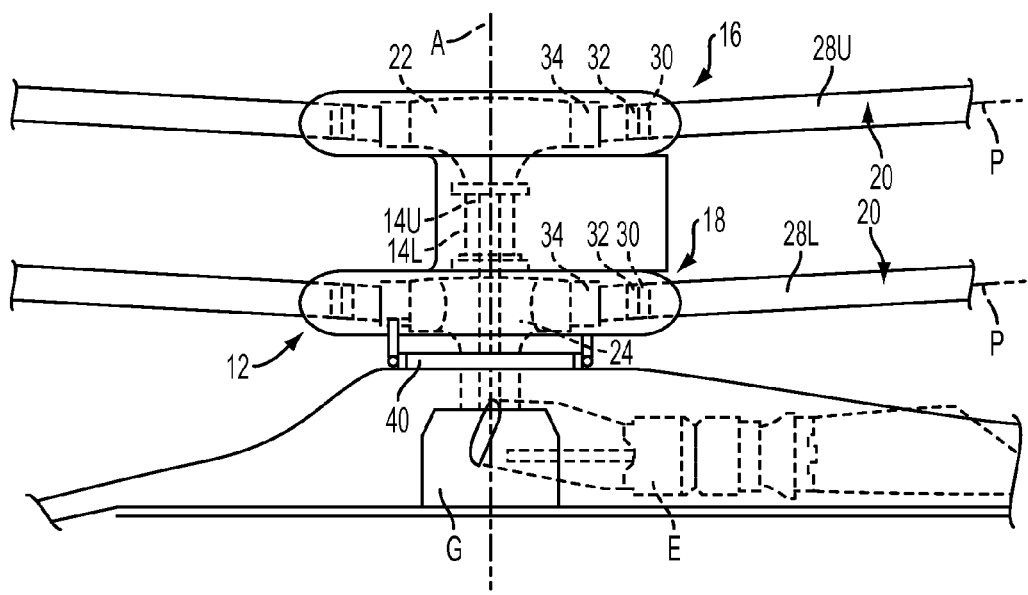
FIG. 2 is an expanded partial phantom view of a dual counter-rotating coaxial rotor system of the aircraft of FIG. 1.

With reference to FIG. 2, a main gearbox G (FIG. 2) is driven by one or more engines or motors (illustrated schematically at E) and drives the rotor system 12. The translational thrust system T may also be driven by the same main gearbox G which drives the rotor system 12. As shown, the main gearbox G may be interposed between the engines E, the rotor system 12 and the translational thrust system T although the precise location is not restricted thereto.

The dual, counter-rotating, coaxial rotor system 12 includes an upper rotor system 16 and a lower rotor system 18. Each of the rotor systems 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter-rotates within the lower rotor shaft 14L which rotates the lower hub assembly 24.

The plurality of the main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically with identifiers "U" for upper and "L" for lower), a rotor blade spindle 30, and a rotor blade bearing 32, which supports the rotor blade spindle 30 within a bearing housing 34 to permit the rotor blade 28 to pitch about a pitching axis P. It should be understood that various blade attachments may also be utilized with the present invention.

Figure 3:
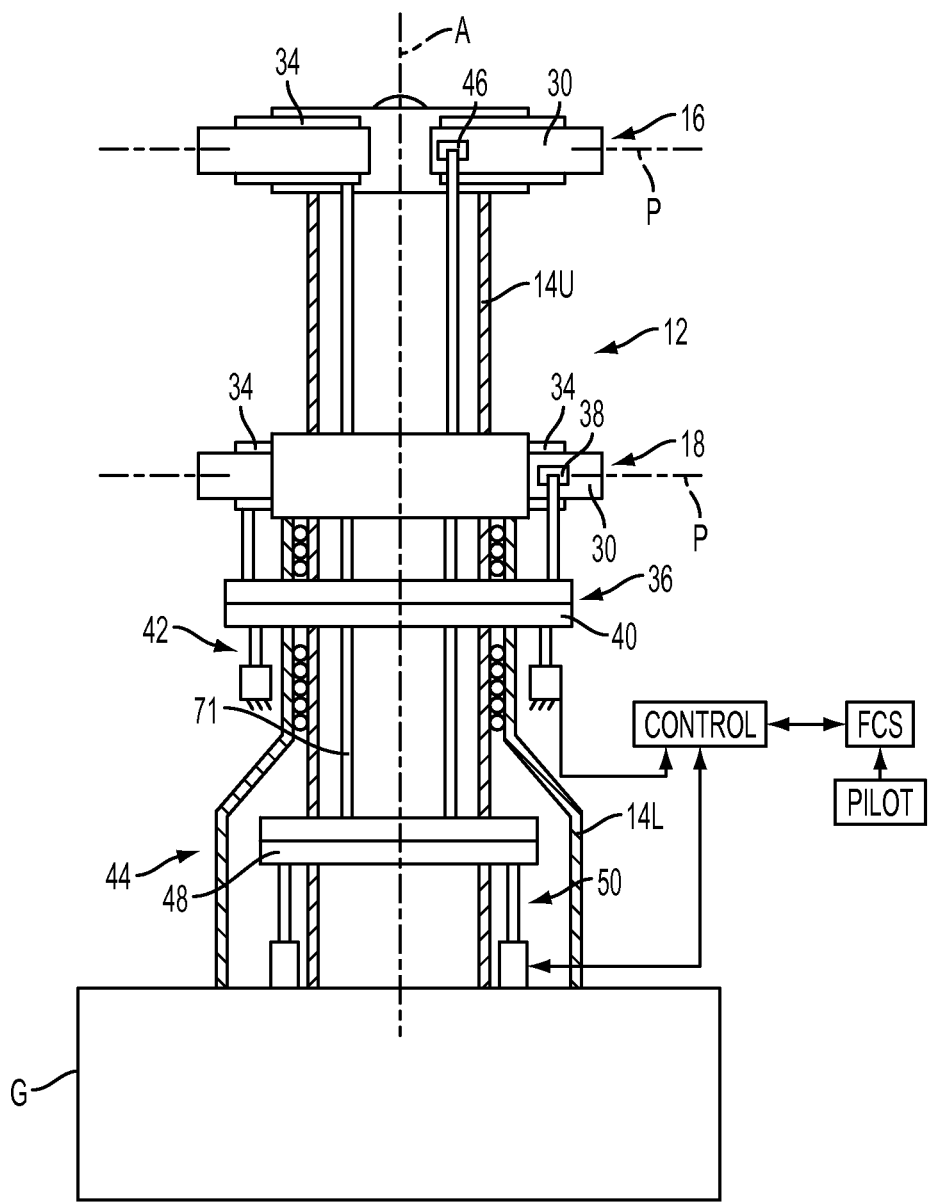
FIG. 3 is a longitudinal sectional view through a dual counter-rotating coaxial rotor system along a rotor system axis of rotation.

Referring to FIG. 3, the rotor system 12 includes a lower rotor control system 36 with a rotor blade pitch control horn 38 mounted for rotation with the rotor blade spindle 30 of each lower rotor blade 28L. Each rotor blade pitch control horn 38 is linked to an actuation mechanism 42 through a lower rotor swashplate assembly 40 to impart the desired pitch control thereto.

An upper rotor control system 44 includes a rotor blade pitch control horn 46 mounted for rotation with the rotor blade spindle 30 of each upper rotor blade 28U. Each rotor blade pitch control horn 46 is linked to an actuation mechanism 50 through an upper rotor swashplate assembly 48 to impart the desired pitch control thereto.

The lower rotor and upper rotor swashplate assemblies 40, 48 translate and/or tilt by the separate actuation mechanisms 42, 50 such that each rotor control system 36, 44 may be independently controlled in both cyclic and collective pitch. Generally, translational motion of the lower rotor and upper rotor swashplate assemblies 40, 48 along the rotor axis A will cause the respective rotor blades 28U, 28L to vary in pitch collectively, while tilting of the lower rotor and upper rotor swashplate assemblies 40, 48 with respect to the rotor axis A will cause the respective rotor blades 28U, 28L to vary in pitch cyclically to ultimately tilt the rotor thrust vector. The rotor control systems 36, 44 preferably communicate with a flight control system that receives pilot inputs from controls such as a collective stick, cyclic stick, foot pedals and the like and/or via fly-by-wire technologies.

It should be understood that primary pitch control links 71, secondary pitch control links 80 (to be described below), lower rotor and upper rotor swashplate assemblies 40, 48 and actuation mechanisms 42, 50 for the respective upper rotor system 16 and lower rotor system 18 may be located internally or externally to the respective main rotor shaft 14U, 14L and that various pitch control links and actuation mechanisms at various locations for cyclic and collective pitch control of the rotor system 12 may be utilized with the present invention as discussed in particular below.

Figure 4:
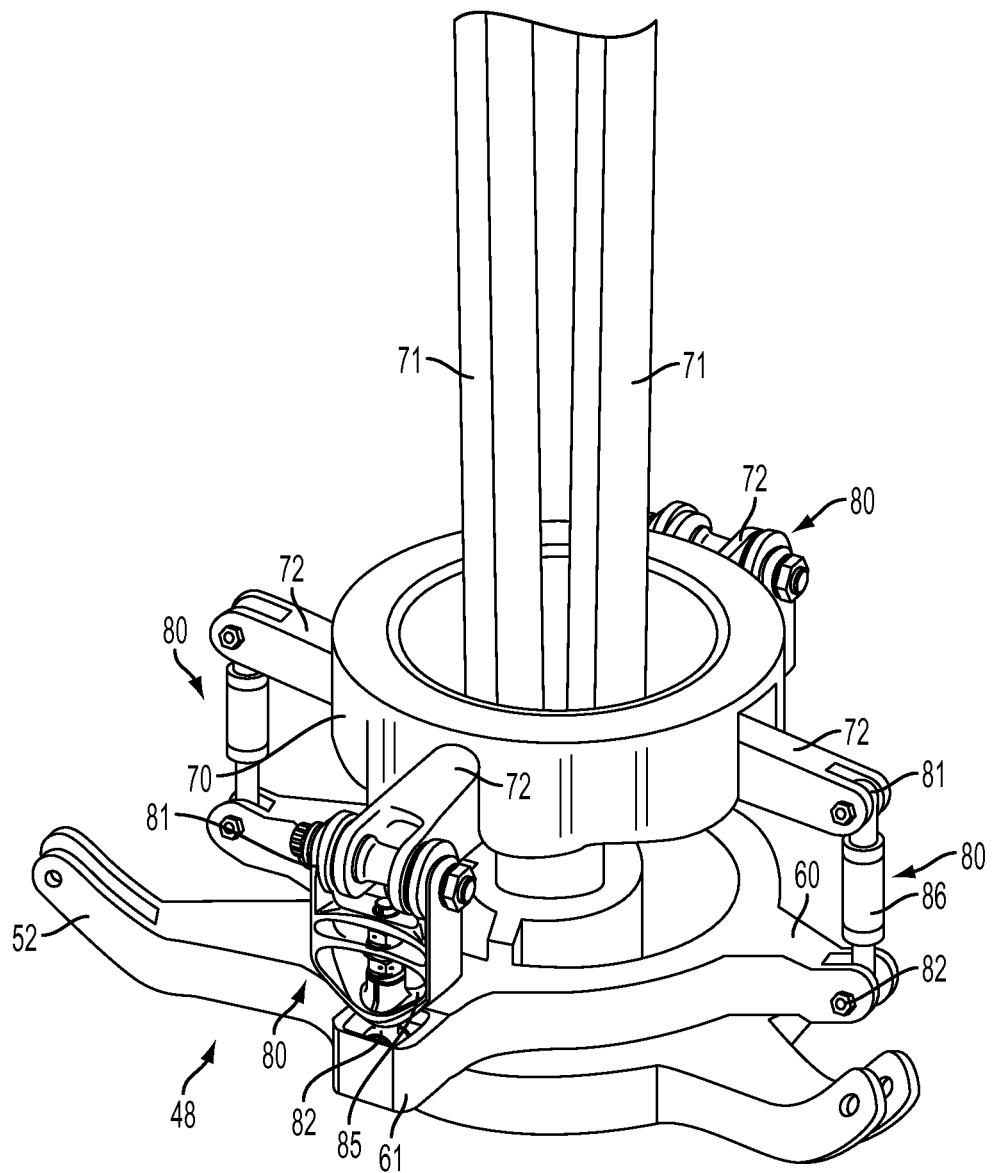
FIG. 4 is a perspective view of a rotor shaft and rotor control system in accordance with embodiments.

With reference to FIG. 4, the upper rotor swashplate assembly 48 for the aircraft 10 of FIG. 1 (i.e., a helicopter) is provided and includes the upper rotor shaft 14U of FIG. 2, which is disposed to support rotation of the upper rotor system 16 of FIG. 2, a stationary swashplate 52 that is ultimately connected to the fixed airframe F of FIG. 1, a rotating swashplate 60 disposed to rotate relative to the stationary swashplate 52, a mixer housing 70 and the secondary pitch control links 80.

The mixer housing 70 rotates with the upper rotor shaft 14U, and is disposed in or proximate to the upper rotor shaft 14U to surround the primary pitch control links 71 for association with the individual blades 28U of the upper rotor system 16. The mixer housing 70 may be attached to the upper rotor shaft 14U such that the mixer housing 70 rotates with the upper rotor shaft 14U. As shown in FIG. 4, the primary pitch control links 71 are provided in a group of four to respectively correspond with each of four blades and are respectively coupled to four elongate elements or walking beams 72. Each of the walking beams 72 is provided as an elongate element that is pivotable relative to the mixer housing 70. Such pivoting causes the pitch control links 71 to correspondingly translate or swing upward or downward.

Although the mixer housing has been described as a feature that surrounds the primary pitch control links 71, it is understood that this is not necessary in all cases and that alternative embodiments exist in which this is not the case. In such alternative embodiments, the mixer housing 70 may be disposed within a grouping of the primary pitch control links 71 or to a side of the primary pitch control links 71. In addition, although the primary pitch control links 71 and the walking beams 72 are described as being provided in groups of four, it is understood that this is not necessary and that more or less number of each can be employed.

Each of the secondary pitch control links 80 has a first end 81 and a second end 82. The respective first ends 81 are coupled to the walking beams 72, and the respective second ends 82 are coupled to bearing elements 61 of the rotating swashplate 60. Prior to use, the secondary control links 80 are axially adjusted as described below to provide for blade tracking and, once the axial adjustment is completed, serve to control the position of the primary pitch control links 71 in accordance with a location and orientation of the rotating swashplate 60 via the walking beams 72.

In accordance with aspects of the invention, a pair of secondary pitch control links 80 is provided as two axially adjustable scissor control links 85 that are each configured to transmit rotation of the upper rotor shaft 14U to the rotating swashplate 60. The reason there are two axially adjustable scissor control links 85 shown is for balance and redundancy about the rotor axis A (see FIG. 2), though the presence of two is not necessary. For example, in some cases where a rotor has an odd (or even) number of blades, only one of the secondary pitch control links 80 may be provided as an axially adjustable scissor control link 85. In any case, the axially adjustable scissor control links 85 exclusively transmit the rotation of the upper rotor shaft 14U to the rotating swashplate 60.

In some cases, the rotating swashplate 60 will tend to resist rotation due to bearing friction generated between the rotating swashplate 60 and the stationary swashplate 52. Without the presence of scissoring members, this bearing friction would cause the secondary pitch control links to rotate or tilt relative to the walking beams 72. As a result, the rotation of the mixer housing 70 would be transmitted to the rotating swashplate 60 in a dragging formation. The coupling in the axially adjustable scissor control links 85 resists the rotation/tilt and prevents the dragging formation from taking effect.

The other two secondary pitch control links 80 shown are similarly balanced about the rotor axis A and may be provided as axially adjustable control links 86 without scissor functionality. The use of the axially adjustable scissor control links 85 and the axially adjustable control links 86 reduces the overall weight of the rotor control system since the scissoring does not have to be provided by a separate, distinctive mechanism.

Figure 5:
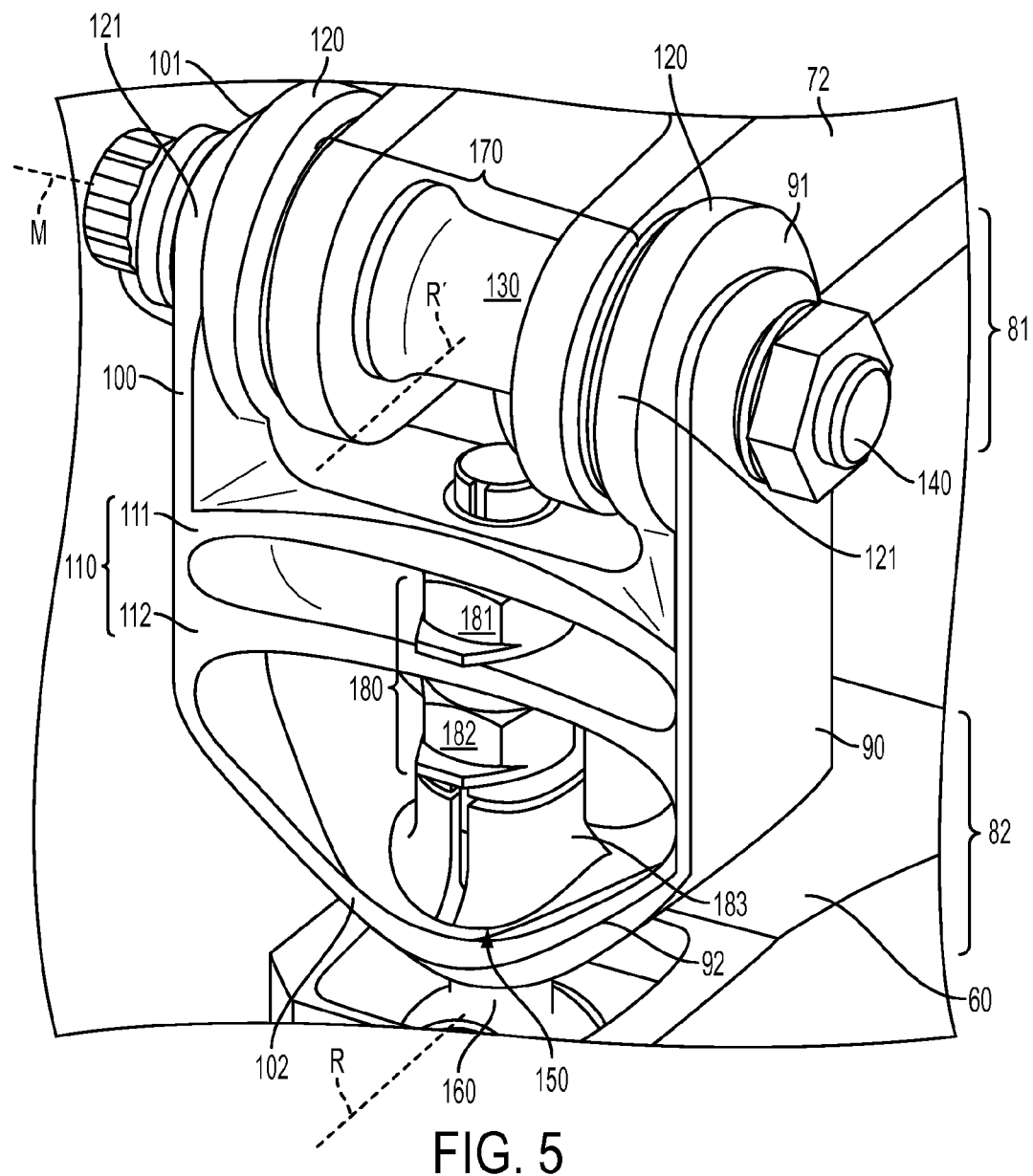
FIG. 5 is a perspective view of an adjustable scissor control link in accordance with embodiments.

With reference to FIG. 5, each of the two axially adjustable scissor control links 85 includes a structure, such as a first sidewall 90, a second sidewall 100 and elements, such as rib members 110 or webbing, which are supportively disposed in the structure. The first and second sidewalls 90 and 100 oppose one another and terminate at respective first ends 91 and 101 as mating elements 120. The mating elements 120 may each include a substantially circular (or alternatively shaped) pad 121 that oppositely faces another pad 121 with a different or the same structure at a distance. The mating elements 120 define a space 130 between the pads 121 in which the corresponding end of the one of the associated walking beams 72 is receivable although it is understood that this end of the walking beam 72 could be received at an exterior of the mating elements 120. In any case, the mating elements 120 and the walking beam 72 are configured to be coupled to one another by way of at least one hinge-pin 140 such that the axially adjustable scissor control link 85 is rotatable about an axis M, which extends through the mating elements 120 along the longitudinal axis of the hinge-pin 140 or a set of coaxial hinge-pins 140.

The wide coupling between each of the axially adjustable scissor control links 85 and the corresponding walking beam 72 generates a moment reaction. This moment reaction is directed in opposition to the forces (i.e., the bearing friction between the rotating swashplate 60 and the stationary swashplate 52) that would cause the axially adjustable scissor control link 85 to tend to rotate about the walking beam 72. Thus, as the mixer housing 70 rotates, the resistance to rotation of the axially adjustable scissor control links 85 caused by the moment reaction results in the transmission of the rotation to the rotating swashplate 60 thereby preventing the dragging formation from taking place as previously described.

It is to be understood that the wide coupling described above could be provided in a reverse configuration to a similar effect. That is, the walking beams 72 could include the mating elements at a distance from one another and the axially adjustable scissor control links 85 could be provided with a single or otherwise narrow mating element that is disposable between the mating elements of the walking beams 72.

Although not required, in accordance with embodiments, the first and second sidewalls 90 and 100 may also be connected with one another at respective second ends 92 and 102, which may be convergent toward one another and formed to cooperatively define a through-hole 150. A rod 160 is extendible through the through-hole 150. The rod 160 is coupled to the rotating swashplate 60 for rotation of the rod 160 about a radial axis R with respect to the upper rotor shaft 14U. The rib members 110 may include an upper rib member 111 and an optional lower rib member 112 and may be connected at opposite ends thereof to inside surfaces of each of the first and second sidewalls 90 and 100 between the respective first ends 91, 101 and the respective second ends 92, 102. The rib members 110 are configured to be coupled to the rod 160 at adjustably variable distances relative to the rotating swashplate 60.

As shown in FIG. 5, buffer (or spacer) elements 170 are disposed about the hinge-pin 140 and between the walking beam 72 and the mating elements 120. The buffer elements 170 ensure that relative translational movement between the walking beam 72 and the mating elements 120 along the axis M is prevented. In a similar fashion, the planar interior surfaces of the mating elements 120 and the exterior surfaces of the walking beam 72 register with one another and thereby provide thrust and prevent rotation of the first and second sidewalls 90 and 100 about an axis R' defined as the centerline of an extension of the walking beam 72 from its pivot in the mixer housing 70. As a result, the two axially adjustable scissor control links 85 act as anti-torque elements in transmitting the rotation of the upper rotor shaft 14U and the walking beams 72 to the rotating swashplate 60.

At least one or more fastening elements 180 may be provided to fasten the rod 160 to the rib members 110 at the adjustably variable distances relative to the rotating swashplate 60. As shown in FIG. 5, the fastening elements 180 may include a first fastening element 181, which is disposable between upper rib member 111 and lower rib member 112 and configured to be threadably tightened onto the rod 160, and a second fastening element 182. The second fastening element 182 may also be threadably tightened onto the rod 160 such that an additional buffer/spacer element 183 is tightly received between the second fastening element 182 and the respective second ends 92 and 102 of the first and second sidewalls 90 and 100. While shown as being wrench-adjustable mechanisms, it is understood that the first and second fastening elements 181 and 182 could be turned by other tools and thus could have other shapes.

In accordance with embodiments, the buffer/spacer elements 183 may be a conical spacer for interfacing with the rod 160 and respective second ends 92 and 102 via the through-hole 150, which may also promote access to the fastening element 182.

During assembly of the rotor control system, the fastening elements 180 can be tightened onto the rod 160 at the adjustably varying distances to ensure that the primary pitch control links 71 (see FIG. 4) are positioned properly for blade tracking. That is, by tightening the fastening elements 180 to the rod 160 at varying axial locations along the rod 160, overall lengths of the two axially adjustable scissor control links 85 can be increased or decreased. The associated walking beams 72 are thus pivoted about the mixer housing 70 and the associated primary pitch control links 71 are re-positioned. While shown as being manually adjustable (such as with a wrench), it is understood that such adjustment can be done with automated mechanisms.

In accordance with further embodiments, at least one or both of the first and second fastening elements 181, 182 need not be located near the middle of the structure and could, in some cases, be provided at the top and/or bottom. In addition, the rod 160 could be screwed into the structure itself at, e.g., the through-hole 150. In this latter case, the respective second ends 92 and 102 would be formed as a rod interface for the rod 160.

Figure 6:
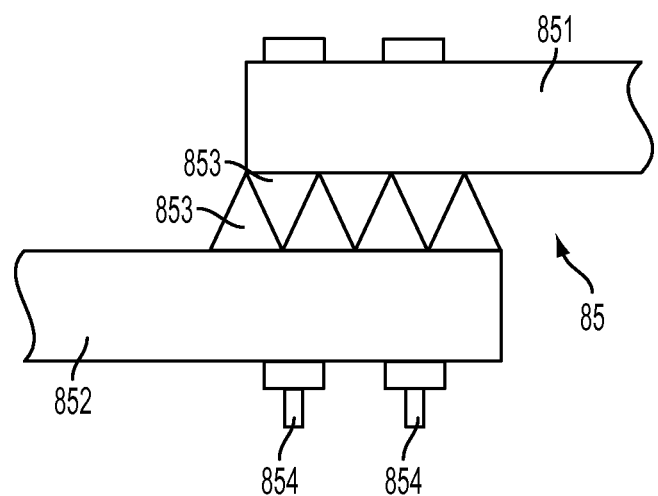
FIG. 6 is a side view of an alternative embodiment of an adjustment feature of an adjustable scissor control link.

In accordance with alternative embodiments and, with reference to FIG. 6, the axially adjustable scissor control links 85 may include one or more first components 851, one or more second components 852, axial adjustment features 853 and fastening elements 854. For each axially adjustable scissor control link 85 provided in accordance with this alternative embodiment, the one or more first components 851 are connectable to a corresponding walking beam 72 and the one or more second components 852 are connectable to the rotating swashplate 60. The axial adjustment features 853 are illustrated in FIG. 6 as teeth in an exemplary embodiment, which are configured for engagement with one another at various axial positions. That is, the more teeth involved in the engagement, the lower the walking beam 72 will be disposed relative to the rotating swashplate 60 and vice versa. The fastening elements 854 are provided to hold the one or more first and second components 851, 852 together.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A control link disposed to transfer rotor shaft rotation from a walking beam rotatable with the rotor shaft to a rotating swashplate, the control link comprising:
   a structure including:
      a first sidewall and a second sidewall terminating at respective first ends as mating elements which are securable to the walking beam such that the walking beam is rotatable about an axis defined through the mating elements and such that a moment reaction in opposition to structure rotation about the walking beam is generated, the first sidewall and the second side wall being convergent toward one another at respective second ends and connecting to each other at their second ends to define a through-hole,
      rib members connected to each of the first sidewall and second sidewall between the first ends and second ends; and
   a rod coupled to the rotating swashplate and configured to be coupled to a second end of the structure and to the rib members at variable distances relative to the rotating swashplate.

2. The control link according to claim 1, further comprising a hinge-pin receivable by the mating elements and the walking beam.

3. The control link according to claim 1, further comprising:
   fastening elements configured to fasten the rod to the rib members at the variable distances.

4. The control link according to claim 1, wherein the mating elements are at a distance from one another.

5. A rotor control system for use with a rotor and an airframe, comprising:
   a rotor shaft disposed to support rotation of the rotor;
   a stationary swashplate connected to the airframe;
   a rotating swashplate disposed to rotate relative to the stationary swashplate;
   a mixer housing and primary pitch control links disposed in the rotor shaft, the primary pitch control links being coupled to pivotable elongate elements, which are pivotable about the mixer housing; and
   secondary pitch control links respectively coupled to the elongate elements and the rotating swashplate to control a position of the primary pitch control links via the elongate elements,
   at least one of the secondary pitch control links being configured as in claim 1 and being adjustable.

6. The rotor control system according to claim 5, wherein the elongate elements are arrayed uniformly about the mixer housing.

7. The rotor control system according to claim 6, wherein two or more elongate elements are provided about the mixer housing for respective association with each of a same number of primary pitch control links.

8. The rotor control system according to claim 6, wherein the secondary pitch control links comprise:
   the at least one of the adjustable scissor control links; and
   at least one adjustable control link.

9. The rotor control system according to claim 8, wherein the at least one of the secondary pitch control links comprises:
   sidewalls terminating at respective first ends thereof as mating elements, which are securable to an elongate element such that the elongate element is rotatable about an axis defined through the mating elements, the sidewalls connecting at respective second ends thereof, which are formed to define a through-hole through which a rod coupled to the rotating swashplate is extendible; and
   ribs connected to each of the sidewalls between the first and second ends and configured to be coupled to the rod at variable distances relative to an end of the rod.

10. The rotor control system according to claim 9, further comprising a hinge-pin receivable by the mating elements and the elongate element.

11. The rotor control system according to claim 9, further comprising fastening elements to fasten the rod to the ribs.

12. The rotor control system according to claim 9, wherein the mating elements each comprise a pad at a distance from the other pad.

13. The rotor control system according to claim 9, wherein the respective second ends of the sidewalls are convergent.

14. The rotor control system according to claim 9, wherein the mating elements are configured to prevent rotation of the sidewalls about the elongate elements.

15. A helicopter, comprising:
   an airframe;
   a rotor, which is rotatable to provide lift force for the airframe; and
   a rotor control system configured to control the rotor, the rotor control system comprising:
   a rotor shaft disposed to support rotation of the rotor;
   a stationary swashplate connected to the airframe;
   a rotating swashplate disposed to rotate relative to the stationary swashplate;
   a mixer housing and primary pitch control links disposed in the rotor shaft, the primary pitch control links being coupled to pivotable elongate elements, which are pivotable about the mixer housing; and
   secondary pitch control links respectively coupled at ends thereof to the elongate elements and the rotating swashplate to control a position of the primary pitch control links via the elongate elements,
   at least one of the secondary pitch control links being configured to transmit rotation of the rotor shaft to the rotating swashplate and being configured as in claim 1 and adjustable.

16. The helicopter according to claim 15, wherein the adjustable scissor control link exclusively transmits the rotation of the rotor shaft to the rotating swashplate.

\* \* \* \* \*